(12) United States Patent
Wolff

(10) Patent No.: US 12,239,147 B2
(45) Date of Patent: *Mar. 4, 2025

(54) FORMED FOOD PRODUCT

(75) Inventor: James B. Wolff, Portland, OR (US)

(73) Assignees: FORMTEC, LLC., Sheboygan, WI (US); SPHERICAL IP, LLC., Tualatin, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/573,371

(22) Filed: Sep. 12, 2012

(65) Prior Publication Data

US 2013/0064962 A1     Mar. 14, 2013

Related U.S. Application Data

(63) Continuation-in-part of application No. 13/374,441, filed on Dec. 29, 2011, and a continuation-in-part of application No. 13/374,417, filed on Dec. 28, 2011, now Pat. No. 9,089,242, and a continuation-in-part of application No. 13/374,421, filed on Dec. 27, 2011, now Pat. No. 9,161,549, and a continuation-in-part of application No. 13/374,422, filed on Dec. 27, 2011, now Pat. No. 9,022,772, and a continuation-in-part of application No. 13/374,423, filed on Dec. 27, 2011, now Pat. No. 9,713,341, which is a continuation-in-part of application No. 13/199,910, filed on Sep. 12, 2011, now Pat. No. 8,985,993.

(51) Int. Cl.
*A23L 13/60*     (2016.01)
*A23P 30/00*     (2016.01)
*A23P 30/10*     (2016.01)

(52) U.S. Cl.
CPC .............. *A23L 13/67* (2016.08); *A23P 30/10* (2016.08)

(58) Field of Classification Search
CPC ................................ A23L 13/67; A23P 30/10
See application file for complete search history.

(56) References Cited

U.S. PATENT DOCUMENTS

| | | | | |
|---|---|---|---|---|
| 3,793,466 A | * | 2/1974 | Hawkins | A23L 1/3177 426/274 |
| 3,934,050 A | * | 1/1976 | Hawkins | A23L 1/3177 426/513 |
| 3,935,319 A | * | 1/1976 | Howard | A23J 3/227 426/802 |
| 4,338,702 A | * | 7/1982 | Holly | A22C 7/00 425/556 |
| 4,535,505 A | * | 8/1985 | Holly | A22C 7/0084 425/228 |
| 4,541,143 A | * | 9/1985 | Holly | A22C 7/0084 426/513 |
| 4,544,560 A | * | 10/1985 | O'Connell | A23L 13/03 426/802 |
| 4,597,135 A | * | 7/1986 | Holly | A22C 7/00 426/513 |
| 4,608,731 A | * | 9/1986 | Holly | A22C 7/0084 426/513 |

(Continued)

OTHER PUBLICATIONS

Science of Meat: What is Meat?, Exploratorium, https://annex.exploratorium.edu/cooking/meat/INT-what-is-meat.html, 2 pages. (Year: 2023).*

*Primary Examiner* — Emmanuel S Luk
(74) *Attorney, Agent, or Firm* — Philip M. Weiss; WEISS & WEISS

(57) ABSTRACT

A food product having aligned fibers.

2 Claims, 4 Drawing Sheets

(56) References Cited

U.S. PATENT DOCUMENTS

| | | | | |
|---|---|---|---|---|
| 4,810,514 | A * | 3/1989 | Guenther | A23L 13/03 |
| | | | | 426/641 |
| 5,021,025 | A * | 6/1991 | Wagner | A22C 7/00 |
| | | | | 425/566 |
| 5,030,164 | A * | 7/1991 | Wagner | A22C 7/0084 |
| | | | | 452/174 |
| 5,037,350 | A * | 8/1991 | Richardson | A23B 4/064 |
| | | | | 452/174 |
| 5,437,886 | A * | 8/1995 | Atkins | A23G 9/48 |
| | | | | 426/512 |
| 6,319,538 | B1 * | 11/2001 | Sheehy | 426/646 |
| 7,416,753 | B2 * | 8/2008 | Lindee | A22C 7/0023 |
| | | | | 426/513 |
| 9,022,774 | B2 * | 5/2015 | Mauer | A23P 30/20 |
| | | | | 425/408 |
| 2007/0098862 | A1 * | 5/2007 | Hansen | A22C 7/0084 |
| | | | | 426/512 |
| 2007/0269567 | A1 * | 11/2007 | McMindes | A23J 3/16 |
| | | | | 426/540 |
| 2008/0089971 | A1 * | 4/2008 | Sandberg | A23P 30/10 |
| | | | | 425/430 |
| 2008/0268112 | A1 * | 10/2008 | Rolan et al. | 426/250 |
| 2017/0224006 | A1 * | 8/2017 | Seemann | A23P 30/10 |
| 2019/0116814 | A1 * | 4/2019 | Le Paih | A22C 7/00 |

\* cited by examiner

FORMED FOOD PRODUCT

RELATED APPLICATIONS

The present application is a continuation-in-part of pending application Ser. Nos. 13/374,441 filed Dec. 29, 2011, 13/374,417, filed Dec. 27, 2011, now U.S. Pat. No. 9,089,242, 13/374,422, filed Dec. 27, 2011 now U.S. Pat. No. 9,022,772, 13/374,421, filed Dec. 27, 2011 now U.S. Pat. No. 9,161,549 and 13/374,423, filed Dec. 27, 2011 now U.S. Pat. No. 9,713,341 which all are a continuation-in-part of application Ser. No. 13/199,910 filed on Sep. 12, 2011 now U.S. Pat. No. 8,985,993.

FIELD OF THE INVENTION

The present invention relates to an improved formed food product.

BACKGROUND OF THE INVENTION

Current forming technology relies on high pressure, speed and complicated material flow pathways which produce a product lacking in quality. High pressure works the meat cells, the higher the pressure the more massaging or squeezing of the meat cells takes place. High speed combined with a complicated flow path massages and works the meat product, releasing myosin/actin from the cells causing the muscle fiber to bind together and contract (protein bind). The contraction takes place during high heat application as in cooking. The action of the meat fiber is to contract in length, this contraction combined with protein bind not only shortens the muscle fiber which if not controlled causes odd cook shapes but a rubber like texture with a tough bite.

In muscle, actin is the major component of thin filaments, which together with the motor protein myosin (which forms thick filaments), are arranged into actomyosin myofibrils. These fibrils comprise the mechanism of muscle contraction. Using the hydrolysis of ATP for energy, myosin heads undergo a cycle during which they attach to thin filaments, exerting a tension, and then depending on the load, perform a power stroke that causes the thin filaments to slide past, shortening the muscle.

Muscle fibril structure is measured from micrometers to several millimeters in length. These fibril structures are bundled together to form muscles. Myofibril proteins are the largest group and probably more is known about these proteins than any other. In muscle cells actin is the scaffold on which myosin proteins generate force to support muscle contraction. Myosin is the major protein that is extracted from the muscle cells by mechanical means.

An important purpose of tumbling and massaging is to solubiliize and extract myofibril proteins to produce a protein exudate on the surface of the meat. The exudates bind the formed pieces together upon heating. Binding strength also increases with increased massaging or blending time. This is due to increased exudate formation on the surface of the meat. Crude myosin extraction is increased with increased blending time.

Grinding/chopping utilizes the concept of rupturing the cell to release protein. This mechanical chopping or shearing takes place at the shear/fill plate hole. This process extracts actin and myosin from muscle cells.

Mixing, utilizes friction and kinetic energy to release protein exudate. Fill hole shape and spacing can cause dead spots and turbulence in the meat flow. This change of direction is a form of mixing and massaging. This is another process, which extracts actin and myosin from muscle cells.

Massaging, utilizes friction and kinetic energy to increase protein extraction. This action takes place almost anywhere meat comes in contact with processing equipment and is moved or has a change of direction via pressure. This is also a procedure which involves extracting actin and myosin from muscle cells.

U.S. Pat. No. 4,315,950 relates to a cooking appliance having a plurality of parallel spaced heat transfer fins. An array of projecting cooking fins on which the hamburger patty is impaled are thermally connected to heat transfer fins. The cooking appliance is introduced into a water based liquid heating medium so that heat is transferred through the fins and projecting grills to the heat interior of the hamburger patty. In this way, cooking is accomplished in a relatively short period of time, and the amount of fat or meat juices boiled away is reduced.

U.S. Pat. No. 4,521,435 relates to a hamburger type meat patty and a method for reducing the weight loss of the patty by applying a juice retaining coating to the patty. The coating contains at least 30% by weight dry powdered egg whites.

U.S. Patent Publication No. 20050042321 relates to a molding apparatus for forming food patties having top and bottom surface contours. The device forms a two-dimensional horizontal profile patty that is curved or otherwise irregular to stimulate the shape of a food item, such as a chicken drumstick.

U.S. Patent Publication No. 20050214399 relates to an apparatus for forming food patties having surface indentations. A mold pattern having open areas and solid areas is arranged adjacent a first face of the cavity and indented from a second face. The patent teaches a patty having one or more grooves in a top surface thereof. The patent teaches a patty having one or more non-longitudinal depressions in at least the top surface of the patty.

U.S. Patent Publication No. 20070054005 relates to a molding apparatus for forming food patties having top and bottom surface contours. The invention teaches a patty having an irregular or curved profile taken through a vertical cross section and a horizontal cross section. The patent teaches a patty having both a top and bottom non flat surface contour.

SUMMARY OF THE INVENTION

It is an object of the present invention for the product of the present invention to comprise less releasing and mixing of myosin with actin then with current formed food products. It is an object of the present invention for the product to have a controlled orientation of the fiber. It is an object of the present invention for the product to have less myosin activity resulting in a better bite/bind and control over the final cook shape.

The present invention relates to a formed food product which is stretched to align the fibers of the product.

It is an object of the present invention for the formed food product to cool uniformly.

It is an object of the present invention for the formed food product to have a softened texture/bite.

It is an object of the present invention for the formed food product to have little or no release of actin and myosin.

It is an object of the present invention for the formed food product to have a controlled length of fiber.

It is an object of the present invention for the formed food product to have a non-random length of fiber.

There are several factors which relate to a cooked formed food product. The factors are cook shape, color, texture or feel, retention of moisture, bite, protein exude.

With regards to current meat patties and other formed food products, the cook shape has a change in diameter and a fall off. The formed food products of the present invention have a consistent cook shape where the patty changes in diameter consistently and there is no fall off of the formed food products. The formed food product holds it shape. In the prior art, the user relied on the grill for the formed food product to hold its shape. With the formed food product of the current invention, the cook shape is held consistently and does not depend on the grill.

With regards to the color, the current formed food product has inconsistent color, delamination, voids and cracking due to an inconsistent transfer of temperature. In the present invention, the formed food product has a consistent color due to consistent contact with the grill.

With regards to the texture and feel, the current formed food products have a cross grain texture with more interference. The formed food product of the present invention has a through grain texture.

With regards to retention of moisture, the current formed food products have an inconsistent moisture retention. The formed food products of the present invention have a consistent controllable retention of moisture and retain more moisture than the prior art.

The formed food products have been found to hold in stores for 45 minutes on average, versus the prior formed food products which last on average for only 15 minutes.

With regards to bite/rubbery, the current products create a rubbery patty product. The formed food products of the present invention is a non-rubbery product.

With regards to protein exudate, the current formed food products exude protein. The formed food product of the present invention is subjected to less mixing and therefore, there is less protein exudate.

The formed food product of the present invention is not subjected to more pressure and so there is less myosin squeezed from the cell membrane.

With regards to a product made from chicken or other formed food product, the current formed food product provides a less spongy product.

The present invention relates to an apparatus and method for accelerating formed food product in order to cause the product to be stretched aligning the fibers of the product. It is an object of the present invention for a hole or orifice to change size from a larger to a smaller diameter with vertical or concave sides. It is an object of the present invention for the sides to have a sharp edge. The principle has design similarities to a venturi. It is referred to as a nozzle, venturi, orifice, or a restriction to flow which results in product acceleration with a corresponding pressure drop through the orifice.

It is an object of the present invention for the venturi to create a reduction in acceleration with an increase in pressure.

By reducing the cross-sectional area of a tube through which a substance passes, the velocity is increased. This is the principle of Conservation of Mass. When the velocity increases the pressure of the material is reduced. This is the principle of the Conservation of Energy.

For every liquid, there is a ratio between the cross-sectional area (C) and the cross-sectional area (c) through which velocity can only be increased by reducing temperature or increasing pressure. Although a food product meat is not a homogeneous liquid, the same concepts still apply. It is impossible to attain a venturi unless there is a transition between the orifices and the small orifice has a finite length. It is an object of the present invention for the transition to be a spherical hemisphere or curved structure which has a diameter which is no greater than the choke flow for the liquid gas or solid used and is no less than the diameter of the connected cylindrical portion.

A venturi allows a smooth transition from a larger orifice to a smaller one. This transition minimizes flow transitions and thereby reduces restrictions in the system. The transition minimizes energy loss and supports fiber alignment.

The transition in a venturi is extremely difficult to create in a production tooling environment. As a result, using the geometric properties of a sphere or similar shape allows the ability to obtain many of the venturi effect properties using standard production practices.

All points on a sphere are the same distance from a fixed point. Contours and plane sections of spheres are circles. Spheres have the same width and girth. Spheres have maximum volume with minimum surface area. All of the above properties allow formed food product to flow with minimum interruptions. There are not static or dead zones. No matter what angle the cylinder intersects the sphere, the cross section is always a perfect circle.

It is an object of the present invention to increase formed food product velocity forcing linear fiber alignment.

It is an object of the present invention to have spherical geometry or a similar shape in fill or stripper plate to create venturi effects.

It is an object of the present invention for the process to make a formed food product cool uniformly and soften the texture/bite of the product.

It is an object of the present invention for the process to make the formed food product heat uniformly.

It is an object of the present invention for the formed food product to be meat, or a meat patty.

All of this is accomplished by creating the venturi effect in any of a fill plate, stripper plate, breather plate, orifice plate for a grinding machine, and any combination of same.

Utilizing the properties of a sphere, the air can achieve acceleration by intersecting a cylinder with a sphere of a larger diameter.

In a sphere, pressure is equal in all directions. Therefore, when the sphere is intersected by a an opening, i.e., a cylinder, the air will move in a direction coaxial with the cylinder at a high velocity. The impact on the food product particles in the breather system is greater because air moving at a higher velocity will generate more momentum and turbulence.

It is an object of the present invention to provide a venturi effect in the hole or orifice by creating a sphere to cylinder hole or opening. This creates a venturi effect or a venturi pump. This accelerates the product through the hole. It is an object of the invention for this to create a self-cleaning breather plate. The spherical cut creates equal pressure in all directions. It is an object of the present invention to have a spherical hemisphere or curved structure which has a diameter which is no greater than the choke flow for the liquid gas or solid used and is no less than the diameter of the connected cylindrical portion. It is an object of the present invention for the spherical hemisphere or curved structure to have a diameter between 1.1 to 2.5 times greater than a cylindrical portion which intersects the same. It is preferred to have a sharper edge from the edge to the hole.

It is an object of the present invention to use spherical hemisphere or curved structure which has a diameter which is no greater than the choke flow for the liquid gas or solid used and is no less than the diameter of the connected cylindrical portion to create conditions to formed food product flow which maintain improved cell structure.

It is an object of the present invention to use spherical geometry, with cylindrical intersections, and the ratio of the diameter of the sphere divided by the area of the cylinder greater than or equal to approximately 1.1 to 2.5 to create conditions to meat flow which maintain improved cell structure.

Irregular shapes do not have diameters, but they do have areas. For a given ratio of a linear item, the ratio becomes the square of the linear ratio. For curved and irregular shapes, the ratio of the initial area and the reduced area is from approximately 1.2 to 6.25.

The present invention relates to a method for preparing a cooked formed food product or meat patty comprising: placing a meat patty or formed food product on a grill. The meat patty or formed food product diameter changes in shape consistently. Little or no meat or product falls off of the formed food product during grilling. The formed food product or meat patty holds shape during cooking. The formed food product or meat patty contacts the cooking surface consistently to cause a consistent color in the formed food product or meat patty.

DETAILED DESCRIPTION

Figure 1:
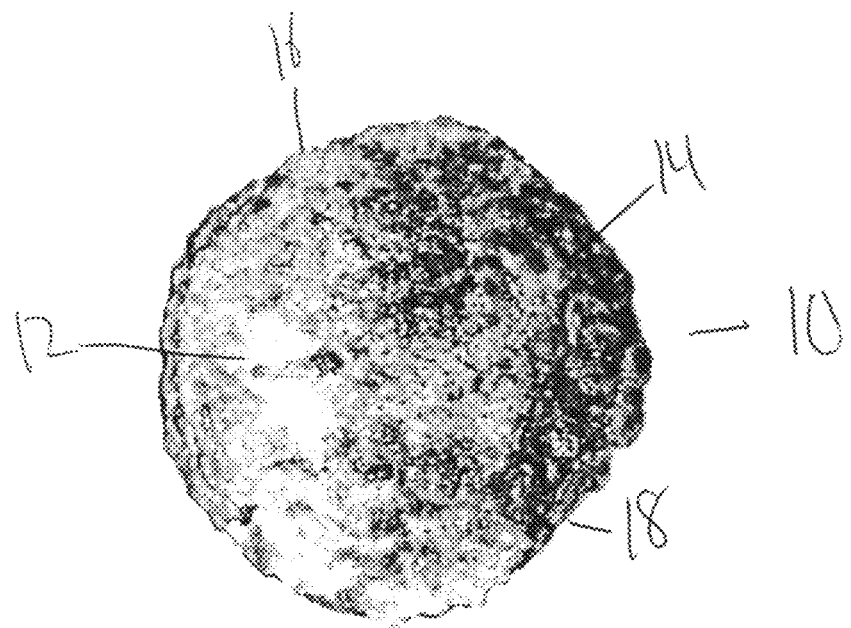
FIG. 1 shows a prior art formed food product or patty.

FIG. 1 shows a prior art formed food product or patty 10, having a lighter less cooked area 12 and a darker more cooked area 14. Sides 16 and 18 of the patty 10 have less of a circular figure and less meat.

Figure 2:
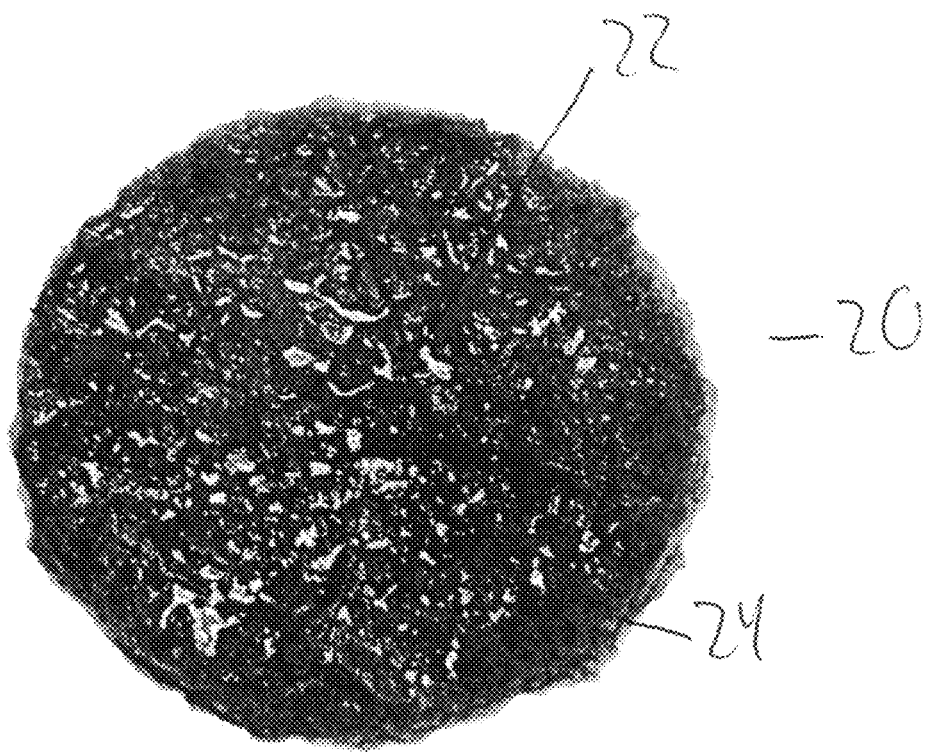
FIG. 2 shows a formed food product or patty of the present invention.

FIG. 2 shows a formed food product or patty 20 having a uniform color top side 22, and even round circular sides 24.

Figure 3:
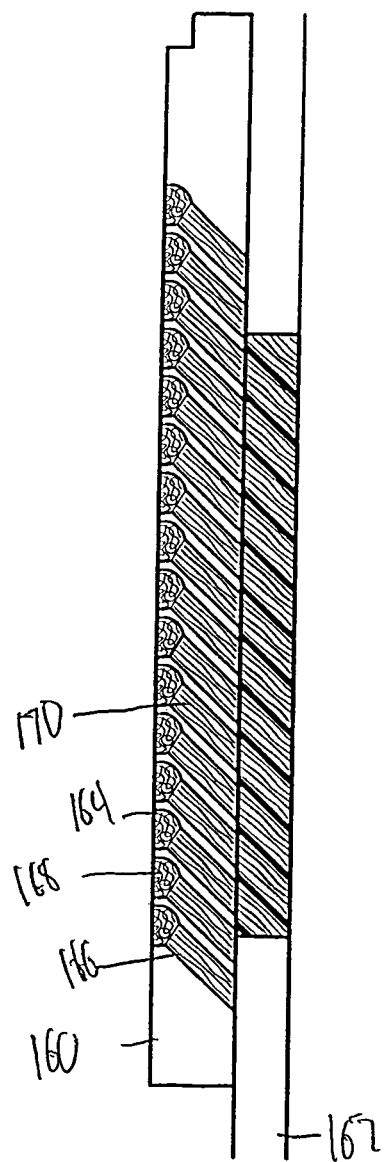
FIG. 3 shows a cross-sectional view of an embodiment of the device of the present invention.

FIG. 3 shows a fill plate 160 and a stripper plate 162 having a sphere 164 and a cylinder 166 showing the random fibers 168 when entering the venturi device and the aligned fibers 170, thereafter.

Figure 4:
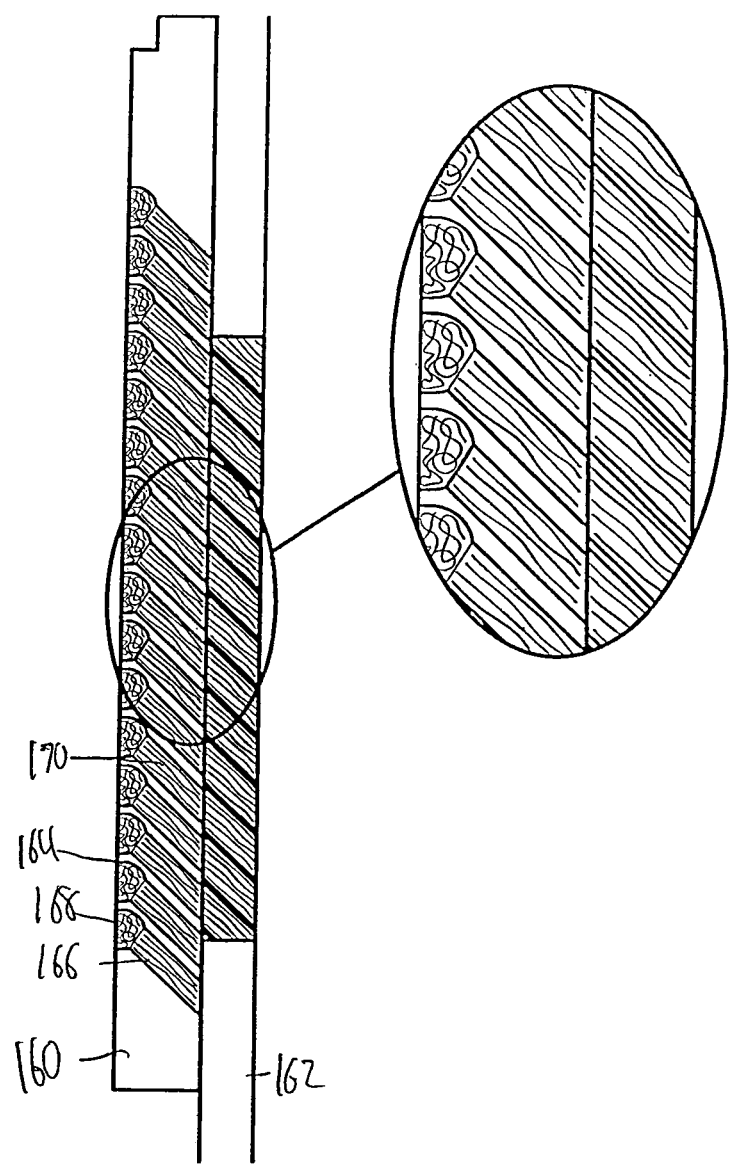
FIG. 4 shows an enlarged view of FIG. 3.

FIG. 4 shows an enlarged view of FIG. 3.

The present invention relates to a formed food product that comprises less releasing and mixing of myosin with actin then with current formed food products. The formed food product has a controlled orientation of the fiber. The formed food product has less myosin activity resulting in a better bite/bind and control over the final cook shape.

The formed food product is stretched to align the fibers of the product. The formed food product cools uniformly. The formed food product to has a softened texture/bite. The formed food product to has little or no release of actin and myosin.

The formed food product to have a controlled length of fiber. The formed food product has a non-random length of fiber.

There are several factors which relate to a cooked formed food product. The factors are cook shape, color, texture or feel, retention of moisture, bite, protein exude.

The formed food products have a consistent cook shape where the patty changes in diameter consistently and there is no fall off of the formed food products. The formed food product holds it shape. The formed food product cook shape is held consistently and does not depend on the grill. The formed food product has a consistent color due to consistent contact with the grill. The formed food product of the present invention has a through grain texture.

The formed food products have a consistent controllable retention of moisture and retain more moisture than the prior art. The formed food products have been found to hold in stores for 45 minutes on average. The formed food products are a non-rubbery product.

The formed food product is subjected to less mixing and therefore, there is less protein exudate. The formed food product is not subjected to more pressure and so there is less myosin squeezed from the cell membrane. With regards to a product made from chicken or other formed food product, the formed food product provides a less spongy product.

The present invention relates to an apparatus and method for accelerating formed food product in order to cause the product to be stretched aligning the fibers of the product.

The present invention increases formed food product velocity forcing linear fiber alignment. The formed food product cools uniformly and softens the texture/bite of the product. The formed food product heats uniformly.

In an embodiment, the formed food product is meat, or a meat patty.

The meat patty or formed food product diameter changes in shape consistently. Little or no meat or product falls off of the formed food product during grilling. The formed food product or meat patty holds shape during cooking. The formed food product or meat patty contacts the cooking surface consistently to cause a consistent color in the formed food product or meat patty.

The present invention relates to fiber orientation technology. The fiber orientation technology, aligns the fibers of formed food product so that the contraction of the muscle fiber that does take place is in a direction of choice controlling both bite and shrinkage. The fiber orientation technology provides a lower resistance to product flow.

The fiber orientation technology provides a better shear surface for a cleaner cut. The fiber orientation technology aligns the fibers in the fill hole so the shearing action disrupts as few muscle cells as possible. The fiber orientation technology decreases the total area of metal fill plate blocking the formed food product flow resulting in less direction change to the product which works the formed food product. The fiber orientation technology pulls the formed food product through the fill hole instead of pushing using the principles of the venturi.

All of these characteristics of fiber orientation technology reduce the release and mixing of myosin with actin, the net effect is a controlled orientation of the fiber, less myosin activity resulting in a better bite/bind and control over the final cook shape.

A spherical geometry feeding into a circular cross section which creates a product velocity increased while maintaining more consistent pressure on the formed food product. A sphere has the following properties:
  All points on a sphere are the same distance from a fixed point.
  Contours and plane sections of spheres are circles.
  Spheres have the same width and girth.
  Spheres have maximum volume with minimum surface area.
  These properties allow meat to flow with minimum interruptions. There are no static or dead zones.
  No matter what angle the cylinder intersects the sphere; the cross section is always a perfect circle.

Pressure inside of a sphere is uniform in all directions.

When formed food product is passed through a circular cross section of a sphere, the fact that pressure is uniform in a sphere creates forces which will be coaxial with the sphere. The reduction in area accelerates the meat through the cylindrical section of the fill plate. The acceleration has been shown empirically to align fibers in the primary direct of flow. Hence, there is fiber orientation.

The invention claimed is:

1. A formed meat patty comprising:
said formed meat patty comprising uncooked ground meat comprised of muscle fibers;
said muscle fibers of said uncooked ground meat consisting of muscle fibers that are stretched and aligned in one direction within said formed meat patty;
said direction being in direction of flow of said uncooked ground meat when forming said formed meat patty;
said formed meat patty having a controlled and non-random, length of muscle fiber;
wherein said muscle fibers being stretched and aligned in one direction within said formed meat patty by a venturi.

2. A formed meat patty comprising:
said formed meat patty comprising uncooked ground meat comprised of muscle fibers;
said muscle fibers of said uncooked ground meat consisting of muscle fibers that are stretched and aligned in one direction within said formed meat patty;
said direction being in direction of flow of said uncooked ground meat when forming said formed meat patty;
said formed meat patty having a controlled and non-random, length of muscle fiber;
wherein said controlled length of muscle fiber is due to a venturi effect.

* * * * *